United States Patent [19]
Stewart et al.

[11] Patent Number: 4,996,877
[45] Date of Patent: Mar. 5, 1991

[54] THREE AXIS INERTIAL MEASUREMENT UNIT WITH COUNTERBALANCED MECHANICAL OSCILLATOR

[75] Inventors: Robert E. Stewart, Woodland Hills; Samuel N. Fersht, Studio City, both of Calif.

[73] Assignee: Litton Systems, Inc., Beverly Hills, Calif.

[21] Appl. No.: 518,075

[22] Filed: Apr. 30, 1990

Related U.S. Application Data

[60] Continuation of Ser. No. 315,447, Feb. 24, 1989, abandoned, which is a division of Ser. No. 251,918, Sep. 30, 1988, abandoned.

[51] Int. Cl.⁵ .................................................. G01P 9/04
[52] U.S. Cl. ............................................... 73/510; 73/505
[58] Field of Search ............................ 73/505, 510, 517 R

[56] References Cited

U.S. PATENT DOCUMENTS

| | | | |
|---|---|---|---|
| 4,510,802 | 4/1985 | Peters | 73/505 |
| 4,744,249 | 5/1988 | Stewart | 73/505 |
| 4,821,572 | 4/1989 | Hulsing | 73/505 |
| 4,841,773 | 6/1989 | Stewart | 73/510 |

Primary Examiner—John Chapman
Attorney, Agent, or Firm—Poms, Smith, Lande & Rose

[57] ABSTRACT

An inertial measurement unit capable of providing information relating to all six degrees of freedom in an orthogonal three axis system is shown having a mechanical oscillator constructed from two counterbalanced platforms which form a single unit for rotation about a single torsional axis. A plurality of accelerometers are mounted upon at least one of the counterbalanced platforms. Each accelerometer has an input axis, an output axis, and a pendulous axis. Each accelerometer is mounted such that the input axis is at a predetermined angle to the single axis of rotation and the counterbalanced platform. The accelerometers are used to measure angular rate along the pendulous axis and linear acceleration along the input axis. These signals may then be electronically separated to produce acceleration and angular rate outputs for a three axis orthogonal system.

11 Claims, 2 Drawing Sheets

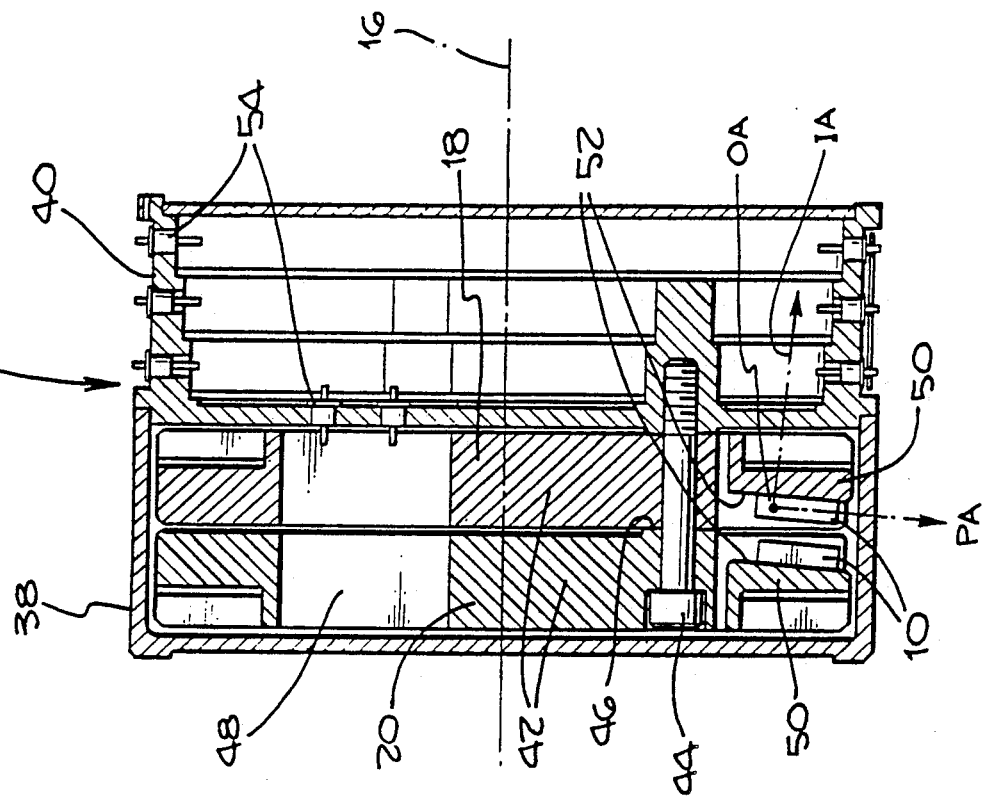
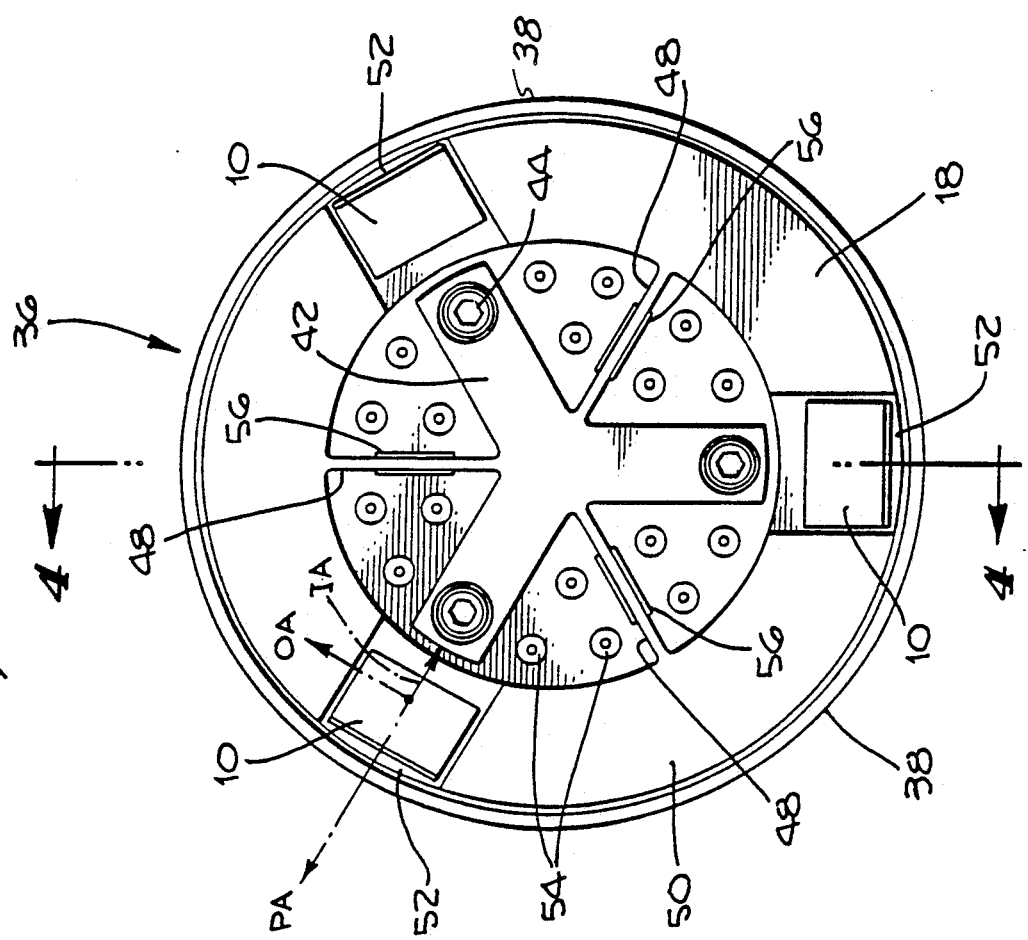

THREE AXIS INERTIAL MEASUREMENT UNIT WITH COUNTERBALANCED MECHANICAL OSCILLATOR

This invention was made with government support under Contract DAAA21-85-C-0290 awarded by the Department of the Army. The Government has certain rights in this invention.

This is a continuation of copending application Ser. No. 07/315,447, filed Feb. 24, 1989, abandoned, which is a divisional of copending application Ser. No. 07/251,918, filed on Sept. 30, 1988, abandoned.

BACKGROUND OF THE INVENTION

1. Field of the Invention

The present invention relates to an inertial measurement unit (IMU) and, more particularly, to a single IMU which measures angular rate and linear acceleration for use in a six degrees of freedom, three axis orthogonal system through the use of a single counterbalanced mechanical oscillator.

2. Description of the Prior Art

Existing strap down inertial measurement units typically consist of a cluster of separate gyros and accelerometers of complex electro-mechanical and/or electro-optical design. These IMUs were originally designed to meet the high performance requirements of an aircraft navigation system with operation times measured in hours. Application of these gyros and accelerometers to flight control IMU's for short duration flight, such as required for expendable weapons which operate in times measured in minutes, has resulted in systems with excessive size, weight, power, and cost, and with inadequate environmental capabilities. Remember that the existing strap down IMUs typically require a separate gyro and accelerometer for each axis within a three axis orthogonal system.

Some systems have been proposed which reduce the number of gyros and accelerometers by using one specialized sensor for sensing two axes. Typically, the specialized sensor is placed upon a spinning shaft. As the multiple sensor is capable of sensing two of the three axes within an orthogonal system, there still remains the requirement for two sets of the sensors as well as the need for motors and bearings to accommodate the spinning axes. This also results in a redundant axis which adds size, weight, and cost.

Another approach to an inertial measurement unit for measuring the specific force and angular velocity of a moving body utilizes an orthogonal triad of rotating accelerometers. This system reduces the number of components required to provide an IMU, but there still remains the requirement for spinning three accelerometers around the three orthogonal axes with the accompanying requirement for bearings and spin motors and resolvers. It has also been suggested that the spinning accelerometers may be vibrated in an oscillating manner instead of spinning around the orthogonal axes.

A breakthrough improvement over the arrangements just described may be found in a copending patent application, Ser. No. 045,045, filed May 1, 1987, by Robert E. Stewart, entitled "A Miniature Inertial Measurement Unit", now U.S. Letters Pat. No. 4,841,773 which is assigned to the same assignee as the present invention. This inertial measurement unit utilizes a single rotor design with six accelerometers mounted at 60° apart on the rim of a paddle-wheel like body. An AC voltage is used to drive piezoelectric strips mounted on the webs of the paddle-wheel like body resulting in a simple harmonic oscillation of the body. The design produces a three axis orthogonal measurement system from but one rotating body. This design works well for some applications but has some difficulty with angular rate performance in the presence of random vibration.

SUMMARY OF THE INVENTION

Accordingly, it is an object of this invention to produce an improved IMU which uses a single axis of rotary motion to provide measurements in a three axis orthogonal system.

It is another object of the present invention to improve the angular rate performance of the IMU.

It is still another object of the invention to provide an improved IMU that uses the Coriolis effect to permit a single inertial sensor, i.e. an accelerometer, to produce both linear acceleration and angular rate outputs thus eliminating the need for expensive gyroscopes.

It is yet another object of the present invention to provide an IMU with a single counterbalanced mechanical oscillator which minimizes the sensitivity of the mechanism to outside vibrations.

A further object of the present invention is to provide a pair of accelerometers which may be utilized to cancel random vibrational signals in such a way that the input axis of the pair are collinear or nearly so.

Still a further object of the present invention is to provide two accelerometers on the same side of a single counterbalanced mechanical oscillator to permit the centrifugal forces to be cancelled in an angular rate output channel.

A final object is to provide a structure with three mounting points for the mechanical oscillator as far from the center of oscillation as possible for producing a stiff mechanism, stiff against any motion that is outside of the plane of rotation.

In accomplishing these and other objects there is provided a single counterbalanced mechanical oscillator constructed from two counterbalanced platforms mounted for rotation about a single axis. A plurality of accelerometers are mounted upon at least one of the counterbalanced platforms. Each accelerometer has an input axis, an output axis, and a pendulous axis. The input axis is arranged at a predetermined angle to the single axis of rotation and to the counterbalanced platform. A suitable driving device, such a piezoelectric strips, is provide for rotating the two counter-balanced platforms 180° out of phase.

DESCRIPTION OF THE DRAWINGS

The benefits and advantages of the present invention will be better understood after reference to the following specification and drawings, wherein:

FIG. 3 is a top view showing one embodiment of the single counterbalanced mechanical oscillator of the present invention and;

FIG. 4 is a cross-sectional view taken along line 4—4 of FIG. 3

DESCRIPTION OF THE PREFERRED EMBODIMENTS

Figure 1:
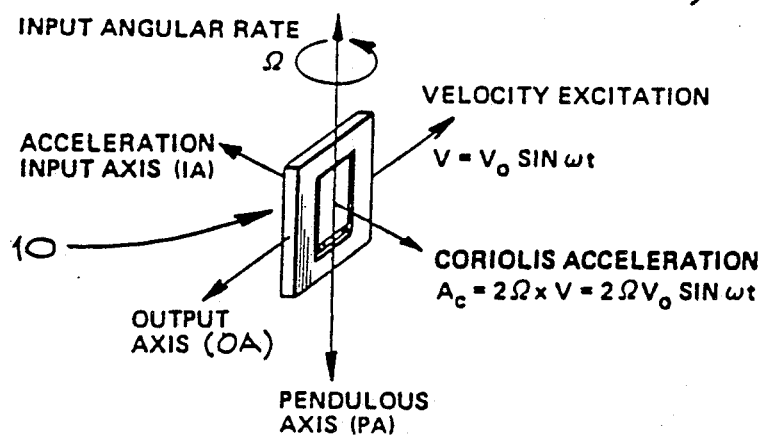
FIG. 1 is a perspective view of an accelerometer used within the present invention.

Referring now to the drawings, FIG. shows an accelerometer 10 useful within the inertial measurement unit of the present invention.

It has been observed in the above-referenced Robert E. Stewart application, Ser. No. 045,045 and elsewhere that complete six degrees of freedom inertial measurement systems, providing measurements of both linear acceleration and angular rate, can be constructed using accelerometers as the only inertial sensor. Angular rate can be measured by accelerometers by sensing Coriolis acceleration. Coriolis acceleration $A_c$ is the linear acceleration resultant from the vector cross product of velocity V with angular rate $\Omega$, i.e., $A_c = 2\Omega \times V$. Physically, this means that if a velocity excitation is applied to the output axis OA of a pendulous accelerometer, angular rate about the accelerometer's pendulous axis PA will be observed as Coriolis acceleration on the instrument's input axis IA as shown in FIG. 1.

Given that Coriolis acceleration makes angular rate observable with linear accelerometers, the problem of how to separate the linear and Coriolis induced components of measured acceleration must be addressed for a viable inertial system to be realized.

One approach for separation of linear and Coriolis induced accelerations is to employ a sinusoidal velocity excitation. As indicated in FIG. 1, a sinusoidal velocity excitation V of the form:

$$V = V_o \sin(\omega t)$$

and an angular rate $\Omega$, along accelerometer's pendulous axis PA, will result in a sinusoidal Coriolis acceleration $A_c$ of the form:

$$A_c = 2\Omega \times V = 2\Omega \times V_o \sin \omega t$$

Therefore, as long as there is no input axis linear acceleration at the velocity excitation frequency, demodulation of the accelerometer's output yields a measurement of angular rate about the instrument pendulous axis PA. Similarly, the component of linear acceleration is easily obtained by filtering the acceleration's output at the velocity excitation frequency.

Figure 2:
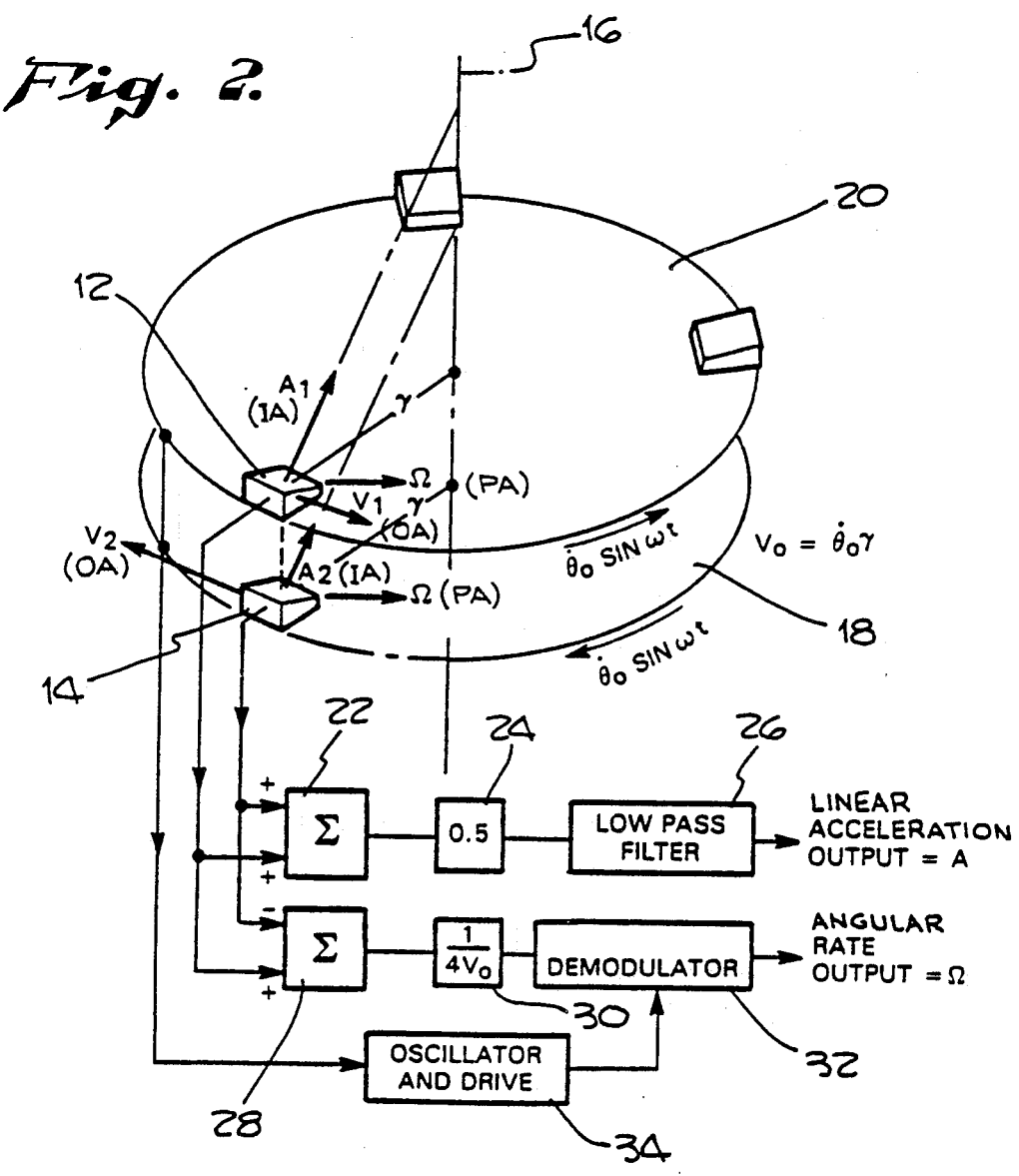
FIG. 2 is a perspective diagram schematically showing the single counterbalanced mechanical oscillator of the present invention with its associated electronics.

Since a multisensor IMU is required to operate in a vibration environment inclusive of the velocity excitation frequency, a common mode rejection mechanization is employed. FIG. 2 shows a single channel mechanization using a matched pair of accelerometers 12 and 14 which are mechanically vibrated about a single axis 16 along their output axis OA (shown at $V_1$ and $V_2$ in FIG. 2) and moved 180° out of phase with respect to each other on countervibrating platforms 18 and 20.

In the presence of an angular rate $\Omega$ along the pendulous axis PA and an acceleration component A along the input axis IA, the total acceleration measured by each accelerometer is:

$$A_1(t) = A(t) + 2\Omega(t)V_o \sin \omega t \quad (1)$$

$$A_2(t) = A(t) - 2\Omega(t)V_o \sin \omega t \quad (2)$$

Subtracting Equations 1 and 2 gives:

$$\Omega(t)\sin\omega t = \frac{1}{4V_o}[A_1(t) - A_2(t)] \quad (3)$$

Adding Equations 1 and 2 gives:

$$A = \frac{1}{2}[A_1(t) + A_2(t)] \quad (4)$$

Equations 3 and 4 are the general equations used to compute linear acceleration A and angular rate $\Omega$. The angular rate is obtained by demodulating $\Omega(t) \sin \omega t$.

The electronics for determining the linear acceleration and angular rate are shown schematically in FIG. 2 including a first summing circuit 22 which adds the acceleration measurements received from accelerometers 12 and 14. The output from the summing circuit 22 is applied to a scaling circuit 24 which, because of the addition of the two acceleration measurements, yields a value that is twice the normal magnitude. Thus, the scaling circuit divides the information by two and passes that information to a low pass filter 26 whose output represents linear acceleration A.

Similarly, the outputs from accelerations 12 and 14 are subtracted at a second summing circuit 28. It will be noted that because the Coriolis vectors which are being subtracted here are in opposite directions. Thus, the difference between the two vectors is twice the Coriolis signal $2\Omega \times V_o$. A scaling circuit 30 therefore divides the signal from summing circuit 28 by $4V_o$ before that signal is applied to an demodulator 32 whose output is the angular rate $\Omega$. An oscillator 34 drives the two platforms 18 and 20 180° out of phase with respect to each other and also applies its signals to the demodulator 32.

Several accelerometer designs may be used in the present invention. One design that may be utilized is disclosed in U.S. Pat. No. 4,679,434, which issued July 14, 1987, by R. E. Stewart. For a more complete description of the mathematically equations utilized by a single IMU to measure a three axis orthogonal system, reference is made to the copending patent application Ser. No. 045,045, filed May 1, 1987, by R. E. Stewart. Finally, a more complete description of the electronics which may be utilized to measure angular rate using Coriolis acceleration and to measure linear acceleration and then to separate the signals into two usable sets may be found in the copending patent application Ser. No. 045,045, by R. E. Stewart.

Referring now to FIGS. 3 and 4, one embodiment of a single IMU for measuring a three axis orthogonal system is shown at 36. The IMU includes a cover 38 which is generally shaped as a cylinder closed at one end. The open end of the cover 38 is closed by an electronics housing 40. The electronics housing 40 includes a plurality of chambers (three of which are shown in the preferred embodiment of FIG. 4) for mounting circuitry used in conjunction with the IMU 36. Mounted to the inner surface of the electrical housing 40 is Y-shaped mounting member 42 which may be attached to the electrical housing 40 by suitable fastening means, such as screws 44. As seen in FIG. 4, the Y-shaped mounting member 42 consists of two members, one stacked on top of the other, to form the mounting surfaces for the moving portions of the two counterbalanced platforms 18 and 20 shown in FIG. 1. It will be seen in FIG. 4 that the cross section of the Y-shaped mounting member 42 is provided with a small standoff 46 which separates the two Y-shaped members 42. Extending from the intersection of the legs of the Y-shaped members 42 are three webs 48 which are connected to the inner diameter of a toroidally shaped rotor 50. The rotor 50 is relieved at three equally spaced pads 52 which are equally spaced at 120° about the periphery of the rotor. Each pad 52 is canted at an angle to the single torsional axis 16 to receive an accelerometer 10.

It will now be seen that FIG. 3 is a view taken from FIG. 4 with the left most platform 20 removed to expose platform 18. The rotor 50 of platform 18 includes three pads 52 which are canted inwardly so that the outer edge of pad 52 is higher than the inner edge thereof in FIG. 3.

In FIG. 4, it will be seen that the platform 20 includes a rotor 50 whose pads 52 have a cant that is lower at its inner edge and slopes upwardly toward the outer edge thereof. In FIG. 4, the reader will note that the angles on pads 52 are parallel to each other to mount the accelerometers in parallel to one another. This mounting arrangement permits the accelerometers on platforms 18 and 20 to form matched pairs such as the two shown in FIG. 4. The reader will now understand that the arrangement of the accelerometers 10 causes the input axis IA, output axis OA, and pendulous axis PA to be mounted in parallel to each other. Suitable wiring terminals 54 are arranged in the electronic housing 40 for connecting the electronics shown in FIG. 2 to the accelerometers 10.

These wire terminals 54 are also used to connect a plurality of piezoelectric drivers 56 formed as thin strips which are mounted on opposite sides of each web 48. The piezoelectric strips 56 are driven by an electric signal such that the strip on one side of web 48 is caused to expand while the strip on the opposite side is caused to contract. This produces a dither-like rotation of the platforms 18 and 20 about the single torsional axis 16. As each platform 18 and 20 is driven 180° out of phase from the other, it will be understood that the rotational force exerted by platform 18 is counterbalanced by the rotational force exerted by platform 20. This arrangement significantly reduces the vibration coupled to the housing 40 that could be caused by a single rotational element. The single counterbalanced mechanical oscillator of the present invention is thus the torsional equivalent of a tuning fork i.e., each platform 18 and 20 is driven at the same natural frequency.

The pendulous axes PA of each set of three accelerometers 10 mounted upon the rotor platform of FIG. 4 are arranged orthogonally to each other. That is, the pendulous axes PA are arranged so that the axes form the edges of a cube whose corner, formed by the edges, is trisected by the torsional axis. In the embodiment shown in FIG. 4 the accelerometers can be rotated about their input axes IA so that the output axis OA and pendulous axis PA can be interchanged or arranged at any angle therebetween. Only one of the rotor platforms in FIG. 4 require accelerometers in an environment that is vibration free, such as space. However, in the preferred embodiment, the accelerometers are mounted on both rotor platforms so that the mating pairs of accelerometers may cancel external, unwanted vibrations while doubling the angular rate and acceleration signals. The cancellation of unwanted vibration permits the dither frequency to be used to sense information including angular rate $\Omega$ and linear acceleration A that permits the tracking of an object upon which the IMU is mounted. Electronics capable of driving the IMUs of FIG. 4 are shown in the copending patent application Ser. No. 045,045, by R. E. Stewart now U.S. Letters Pat. No. 4,841,773. The only major difference is that the dither driver shown therein generates a sine and a cosine signal for driving the two platforms 18 and 20 or 70 and 72 180° out of phase.

It will be understood that other variations of the single axis IMU for measuring a three axis orthogonal system are possible within the teachings of the present invention which should be limited only by the appended claims.

We claim:

1. A three axis inertial measurement unit, comprising:
   two counterbalanced mechanisms each mounted for mechanical oscillation at a natural frequency about a single axis wherein one mechanism counterbalances the other;
   said two counterbalanced mechanisms mounted by mounting means for imparting rotational motion thereto only in a respective plane of rotation perpendicular to said single axis;
   a plurality of accelerometers mounted on at least one of said counterbalanced mechanisms;
   each accelerometer having at least an input axis;
   said plurality of accelerometers mounted upon said at least one counterbalanced mechanism such that said input axis of each acceleromoter is at a predetermined angle to said single axis and to said single plane of rotation of said counterbalanced mechanisms.

2. The inertial measurement unit of claim 1, additionally comprising:
   said rotational motion of said counterbalanced mechanisms is a dithered rotational motion;
   said single axis is a torsional axis; and
   drive means for driving each of said counterbalanced mechanisms at a dithered oscillation that is 180° out of phase.

3. The inertial measurement unit of claim 2, additionally comprising:
   said plurality of accelerometers mounted upon said at least one counterbalanced mechanism include three accelerometers mounted upon said at least one mechanism for providing inertial measurements in a vibration-free environment.

4. The inertial measurement unit of claim 2, additionally comprising:
   said plurality of accelerometers mounted upon at least one counterbalanced mechanism include six accelerometers with three accelerometers mounted upon each counterbalanced mechanism for providing inertial measurements in a vibrating environment.

5. The inertial measurement unit of claim 4, additionally comprising:
   said three accelerometers mounted upon one of said two counterbalanced mechanisms form matched pairs with said three accelerometers mounted upon the second of said counterbalanced mechanisms, such that said input axis of each matched accelerometer pair is parallel to one another and at a predetermined angle to said single torsional axis.

6. The inertial measurement unit of claim 2, additionally comprising:
   said accelerometers are silicon accelerometers; and
   said drive means are piezoelectric strips mounted upon said mounting means for said counterbalanced mechanisms.

7. A three axis inertial measurement unit, comprising:
two counterbalanced platforms each mounted for mechanical oscillation at a natural frequency about a single torsional axis wherein the first platform counterbalances the second;
a plurality of accelerometers mounted on at least one of said platforms;
each accelerometer having at least an input axis,
said plurality of accelerometers mounted upon said at least one platform such that said input axis of each accelerometer is at a predetermined angle to said single torsional axis and said platform;
said two counterbalanced platforms each having:
a Y-shaped mounting member;
a rotor member surrounding said Y-shaped mounting member; and
web members joining said Y-shaped mounting member to said rotor member;
said accelerometers mounted upon said at least one of said platforms mounted upon said rotor member thereof at said predetermined angle.

8. The inertial measurement unit of claim 7, additionally comprising:
said plurality of accelerometers include six accelerometers having three each mounted 120° apart upon each rotor member and arranged in matched pairs with said input, output, and pendulous axes of each pair mounted in parallel to each other and at predetermined angles to said single torsional axis.

9. The inertial measurement unit of claim 7, additionally comprising:
piezoelectric drivers mounted upon said web means to drive said two counterbalanced platforms 180° out of phase from each other during said dithered rotation thereof.

10. The inertial measurement unit of claim 1, additionally comprising:
said accelerometers each having an input axis, an output axis, and a pendulous axis.

11. The inertial measurement unit of claim 7, additionally comprising:
said accelerometers each having an input axis, an output axis, and a pendulous axis.

* * * * *

UNITED STATES PATENT AND TRADEMARK OFFICE
CERTIFICATE OF CORRECTION

PATENT NO. : 4,996,877

DATED : March 5, 1991

INVENTOR(S) : Robert E. Stewart

It is certified that error appears in the above-identified patent and that said Letters Patent is hereby corrected as shown below:

Cover Page, Col. 1, line 4, after "[75]" cancel "Inventors: Robert E. Stewart, Woodland Hills; Samuel N. Fersht, Studio City, both of Calif." and insert --Inventor: Robert E. Stewart, Woodland Hills, Calif.--

Signed and Sealed this

First Day of September, 1992

Attest:

DOUGLAS B. COMER

Attesting Officer

Acting Commissioner of Patents and Trademarks